United States Patent
Tosa et al.

(10) Patent No.: US 10,448,344 B2
(45) Date of Patent: Oct. 15, 2019

(54) COMMUNICATION APPARATUS AND COMMUNICATION SYSTEM

(71) Applicant: Mitsubishi Electric Corporation, Tokyo (JP)

(72) Inventors: Takatoshi Tosa, Tokyo (JP); Takashi Maeda, Tokyo (JP); Takeshi Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 346 days.

(21) Appl. No.: 15/000,165

(22) Filed: Jan. 19, 2016

(65) Prior Publication Data
US 2017/0094614 A1 Mar. 30, 2017

(30) Foreign Application Priority Data
Sep. 29, 2015 (JP) ................. 2015-190708

(51) Int. Cl.
*H04B 7/00* (2006.01)
*H04W 52/38* (2009.01)
(Continued)

(52) U.S. Cl.
CPC ............ *H04W 52/38* (2013.01); *H04B 17/27* (2015.01); *H04W 52/281* (2013.01); *H04W 52/283* (2013.01)

(58) Field of Classification Search
CPC .......... H04W 52/288; H04W 56/0045; H04W 68/005; H04W 72/005; H04W 74/085
(Continued)

(56) References Cited

U.S. PATENT DOCUMENTS

2010/0312432 A1* 12/2010 Hamada ................. G08G 1/163
701/31.4
2014/0045556 A1* 2/2014 Subramanian .... H04W 52/0251
455/574

FOREIGN PATENT DOCUMENTS

DE 112008003633 B4 2/2014
EP 2276012 B1 8/2014
(Continued)

OTHER PUBLICATIONS

Communication dated Jul. 26, 2016, from the Japanese Patent Office in counterpart application No. 2015190708.

*Primary Examiner* — Tu X Nguyen
(74) *Attorney, Agent, or Firm* — Sughrue Mion, PLLC; Richard C. Turner (57) ABSTRACT

There is provided a communication apparatus and a communication system that reduces communication interference in inter-vehicle communication by considering the emergency degree of the environment around a vehicle and the accident incidence rate in each traveling scene and that raises the communication quality of high-emergency-degree data. The communication apparatus has a communication unit that has a power setting unit and performs inter-vehicle communication and a control unit that has a vehicle information acquisition unit for acquiring vehicle information and a reference vehicle position estimation unit for estimating the present position of a reference vehicle and controls the communication unit; when high-emergency-degree information of the reference vehicle is transmitted by use of vehicle information, the control unit controls the communication unit in such away that transmission is performed with increased transmission power.

9 Claims, 4 Drawing Sheets

(51) Int. Cl.
*H04W 52/28* (2009.01)
*H04B 17/27* (2015.01)

(58) Field of Classification Search
USPC .................................................. 455/522, 13.4
See application file for complete search history.

(56) References Cited

FOREIGN PATENT DOCUMENTS

| | | | |
|---|---|---|---|
| JP | 200877320 | A | 4/2008 |
| JP | 2008236237 | A | 10/2008 |
| JP | 2009059199 | A | 3/2009 |
| JP | 2010-283733 | A | 12/2010 |
| WO | 2009107297 | A1 | 9/2009 |

* cited by examiner

COMMUNICATION APPARATUS AND COMMUNICATION SYSTEM

BACKGROUND OF THE INVENTION

Field of the Invention

The present invention relates to a communication apparatus and a communication system that are utilized for assisting a driver in his drive and control of a vehicle through inter-vehicle communication, which is communication between a vehicle and another vehicle.

Description of the Related Art

In a drive assistance system and a vehicle control system, vehicles exchange information items such as traffic situations and the positions of respective reference vehicles through inter-vehicle communication, for the purpose of preventing a traffic accident and alleviating traffic congestion.

In this case, in general, the vehicle of an information provider broadcasts (including "multicast", and the same applies hereinafter) the same information with a maximum transmission power and in a recurrent manner, for the purpose of securely providing the same information to unspecified communication counterparts around the vehicle.

However, communication with a constant maximum transmission power among vehicles causes a problem because in an environment where the traffic is heavy, electromagnetic-wave interference is liable to deteriorate the qualities and the efficiencies of respective communication instances.

As a method of controlling transmission power for the broadcast, for example, the method disclosed in Patent Document 1 is known. In this method, in order to raise the communication quality, a data reception vehicle demands that communication power should be increased when the communication quality is the same as or lower than a specified value, and hence a data transmission vehicle increases the communication power and then transmits the data again.

[Patent Document 1] Japanese Patent Application Laid-Open No. 2010-283733

However, in the control method disclosed in Patent Document 1, the emergency degree or the like of data contents themselves is not considered; therefore, for example, there has been a problem that because two or more vehicles resend low-emergency-degree data (e.g., the road traffic information of a 10-km-apart position) with increased transmission power, high-emergency-degree data (e.g., information of a vehicle that is approaching) from another vehicle cannot be received.

SUMMARY OF THE INVENTION

The present invention has been implemented in consideration of the foregoing problems; the objective thereof is to provide a communication apparatus and a communication system that reduces communication interference in inter-vehicle communication by considering the emergency degree of the environment around a vehicle and the accident incidence rate in each traveling scene and that raises the communication quality of high-emergency-degree data.

A communication apparatus according to the present invention is mounted in a vehicle and includes a communication unit that has a power setting unit and performs inter-vehicle communication and a control unit that has a vehicle information acquisition unit for acquiring vehicle information and a reference vehicle position estimation unit for estimating a present position of a reference vehicle and controls the communication unit (11); when transmitting high-emergency-degree information of the reference vehicle by use of vehicle information, the control unit controls the communication unit in such a way that transmission is performed with increased transmission power.

Because a communication apparatus according to the present invention transmits high-emergency-degree data with increased transmission power, improvement of the communication quality of the high-emergency-degree data can be expected; thus, high-emergency-degree information can more securely be transmitted than ever before.

The foregoing and other object, features, aspects, and advantages of the present invention will become more apparent from the following detailed description of the present invention when taken in conjunction with the accompanying drawings.

DETAILED DESCRIPTION OF THE INVENTION

Embodiment 1

Figure 1:
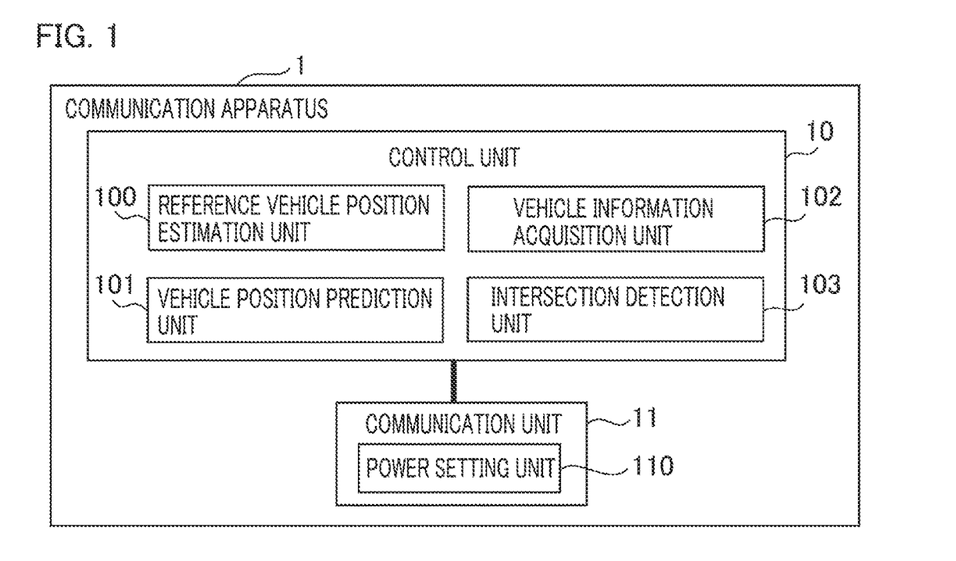
FIG. 1 is a configuration diagram illustrating a communication apparatus according to Embodiment 1 of the present invention.

Embodiment 1 of the present invention will be explained below. FIG. 1 is an explanatory diagram illustrating the configuration of a communication apparatus according to Embodiment 1 of the present invention.

As illustrated in FIG. 1, a communication apparatus 1 according to Embodiment 1 of the present invention includes a control unit 10 and a communication unit 11. The control unit 10 controls the communication unit 11 so that inter-vehicle communication conforming to an intended channel and intended communication power is realized. The communication unit 11 realizes a communication function to be utilized in inter-vehicle communication. The communication apparatus 1 is mounted in a vehicle.

The control unit. 10 includes a reference vehicle position estimation unit 100, a vehicle position prediction unit 101, a vehicle information acquisition unit. 102, and an intersection detection unit 103. The communication unit 11 has a power setting unit 110.

The reference vehicle position estimation unit 100 estimates the present position (absolute position) of a reference vehicle. It does not matter which ever estimation method is utilized; however, as an example, a method is appropriately conceivable in which the position of a reference vehicle is determined by utilizing existing GPS information and map information. In FIG. 1, although being described integrally with the vehicle position prediction unit 101, the vehicle information acquisition unit 102, and the intersection detection unit 103; however, the reference vehicle position estimation unit 100 may be separated from these units. In that case, the control unit 10 includes the vehicle position prediction unit 101, the vehicle information acquisition unit 102, the intersection detection unit 103, and an independent reference vehicle position estimation unit 100. In addition, in the case where the reference vehicle position estimation unit 100 is independent, information on the position of the reference vehicle may be obtained through the vehicle information acquisition unit 102, described later.

The vehicle position prediction unit 101 estimates the respective present positions of neighboring vehicles by use of vehicle information items, (such as GPS positions, speeds, and traveling directions) of the neighboring vehicles, that are obtained through inter-vehicle communication. It does not matter which ever means is taken in the estimation method; however, as an example, a method is appropriately conceivable in which based on the GPS positions, the speeds, and the traveling directions, it is regarded that the neighboring vehicles have travelled at a constant speed by a distance corresponding to the delay time in the communication.

The vehicle information acquisition unit 102 acquires information on the speed, the acceleration, and the like of the reference vehicle. It does not matter which ever acquisition method is utilized; however, as an example, a method is conceivable in which the vehicle information is calculated based on a pulse signal in the vehicle or in which the vehicle information is acquired from an external ECU (Engine Control Unit) mounted in the vehicle, through CAN communication.

The intersection detection unit 103 detects intersections around the present position of the reference vehicle and the timings of entering the intersections. The entering timing is expressed by the number of seconds that elapses before entering an intersection; the number of seconds for an intersection that is not to be entered is set to an ineffective value (e.g. −1). The detecting method is not specified; however, as an example, a method is conceivable in which a neighboring intersection is detected by use of map information and the position of the reference vehicle and in which the timing of entering the intersection is calculated based on the traveling direction of the reference vehicle and the traveling road.

The power setting unit 110 controls setting of transmission power, i.e., increasing or decreasing of communication power in response to a demand from the control unit 10. The communication unit 11 performs communication with the communication power set by the power setting unit 110.

Hereinafter, the typical operation of the communication apparatus according to Embodiment 1 will be explained with reference to the flowcharts in FIGS. 2 through 5.

Figure 2:
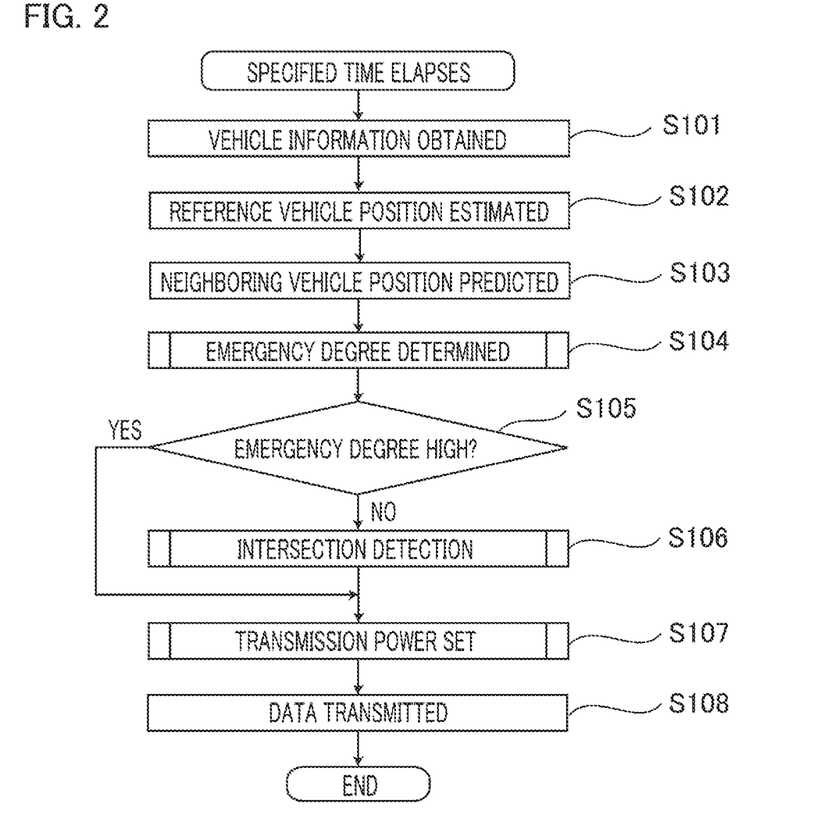
FIG. 2 is a flowchart for explaining the operation of the communication apparatus according to Embodiment 1 of the present invention.

The control unit 10 implements processing, described in the flowchart in FIG. 2, every predetermined specified time. At first, the control unit 10 obtains vehicle information through the vehicle information acquisition unit 102 (the step S101). The obtained vehicle information is utilized in the reference vehicle position estimation unit 100.

Next, the control unit 10 estimates the position of the reference vehicle through the reference vehicle position estimation unit 100 (the step S102). After that, the control unit 10 predicts the position of a neighboring vehicle, by use of vehicle position prediction unit 101 (the step S103). The position of the reference vehicle and the position of the neighboring vehicle obtained in the steps S102 and S103, respectively, are utilized in the step S104, described later.

Based on the reference vehicle position obtained in the step S102 and the neighboring vehicle position obtained in the step S103, the control unit 10 performs emergency degree determination (the detail thereof will be described later) (the step S104). In the case where it is determined in the step S104 that the emergency degree is high (the step S105: YES), transmission power setting processing (the step S107), described later, is implemented in contrast, in the case where it is not determined that the emergency degree is high (the step S105: NO), intersection detection processing (the step S106), described later, and the transmission power setting processing (the step S107) are sequentially implemented.

Figure 3:
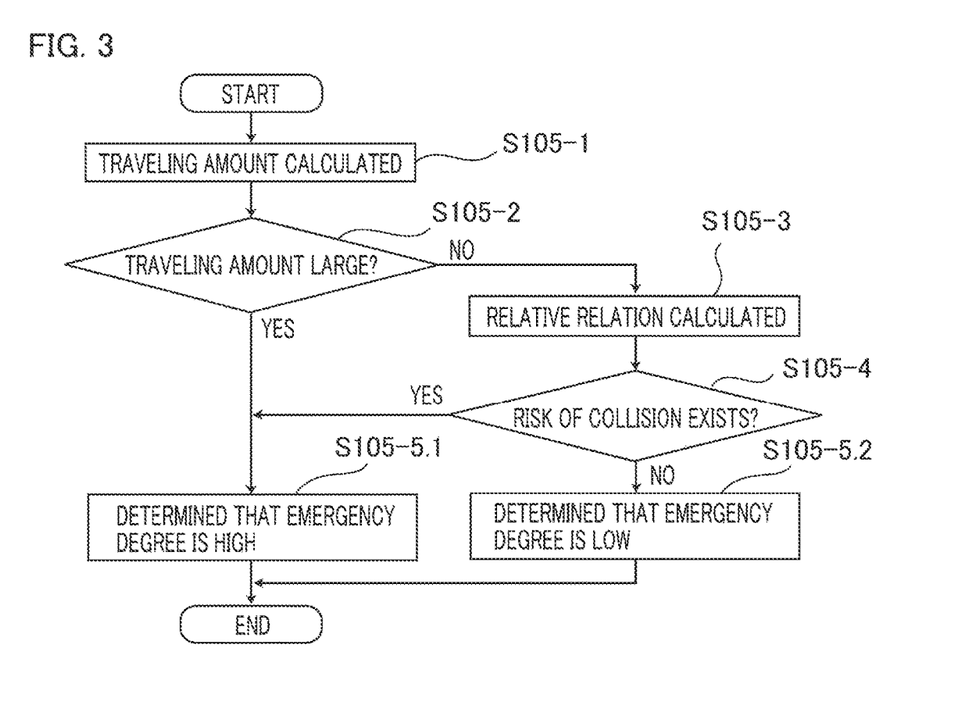
FIG. 3 is a flowchart represent ing emergency degree determination processing in the communication apparatus according to Embodiment 1 of the present invention.

The emergency degree determination in the step S104 will be explained with reference to the flowchart in FIG. 3. At first, the control unit 10 calculates the traveling amount of the vehicle, based on the vehicle information obtained in the step S101 (the step S105-1). In the case where the traveling amount of the vehicle is large (the step S105-2: YES), it is determined that the present state is a high-emergency-degree state where, for example, lane changing or sudden braking, which is a sudden travel of the reference vehicle, has occurred (the step S105-5.1); then, the processing is ended. In the case where it is determined that the traveling amount of the vehicle is not large (the step S105-2: NO), the step S105-2 is followed by the step S105-3.

In the step S105-3, based on the vehicle information obtained in the step S101, the reference vehicle position obtained in the step S102, and the neighboring vehicle position information obtained in the step S103, the control unit 10 calculates the relative relationship between the reference vehicle and the neighboring vehicle. Specifically, by use of the positional information, the vehicle speed, the traveling direction, and the acceleration value, the control unit 10 calculates a change in the relative position in a time period between the present timing and the timing after a specified time.

In the case where the change in the relative position, obtained in the step S105-3, suggests that there exists a risk of collision (e.g., a collision may occur after several seconds) between the reference vehicle and the neighboring vehicle (the step S105-4: YES), it is determined that the emergency degree is high (the step S105-5.1) and then the processing is ended. In the case where because there exists no vehicle around the reference vehicle, no risk of collision exists (the step S105-4: NO), it is determined that the emergency degree is low (the step S105-5.2) and then the processing is ended.

Figure 4:
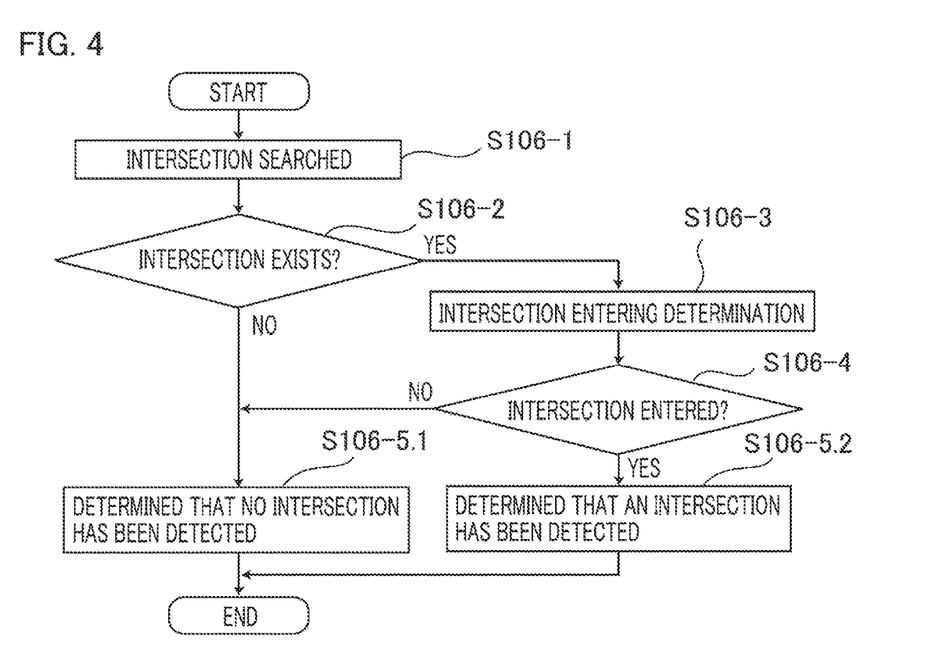
FIG. 4 is a flowchart representing intersection detection processing in the communication apparatus according to Embodiment 1 of the present invention.

The intersection detection processing (the step S106) will be explained with reference to the flowchart in FIG. 4. At first, the intersection detection unit 103 makes a search for an intersection around the reference vehicle (the step S106-1). In the case where there exists an intersection around the reference vehicle (the step S106-2: YES), the step S106-2 is followed by the step S106-3. In the case where there exists no intersection around the reference vehicle, it is determined that no intersection has been detected (the step S106-5.1) and then the processing is ended.

In the step S106-3, an intersection entering determination is implemented. Specifically, by use of the vehicle information obtained in the step S101, road link information (it does not matter which ever method of obtaining it is utilized; however, for example, it can be obtained with reference to a map information), and the like, the control unit 10 calculates so as to determine whether or not the reference vehicle may enter the intersection searched in the step S106-1 within a predetermined specified time.

In the case where the result of determination processing in the step S106-3 suggests that the reference vehicle may enter the intersection within the specified time (the step S106-4: YES), it is determined that an intersection is detected. (the step S106-5.2) and then the processing is ended. In the case where the reference vehicle may not enter the intersection within the specified time (for example, the neighboring intersection is not connected with the road on which the reference vehicle travels) (the step S106-4: NO), it is determined that no intersection has been detected (the step S106-5.1) and then the processing is ended.

Figure 5:
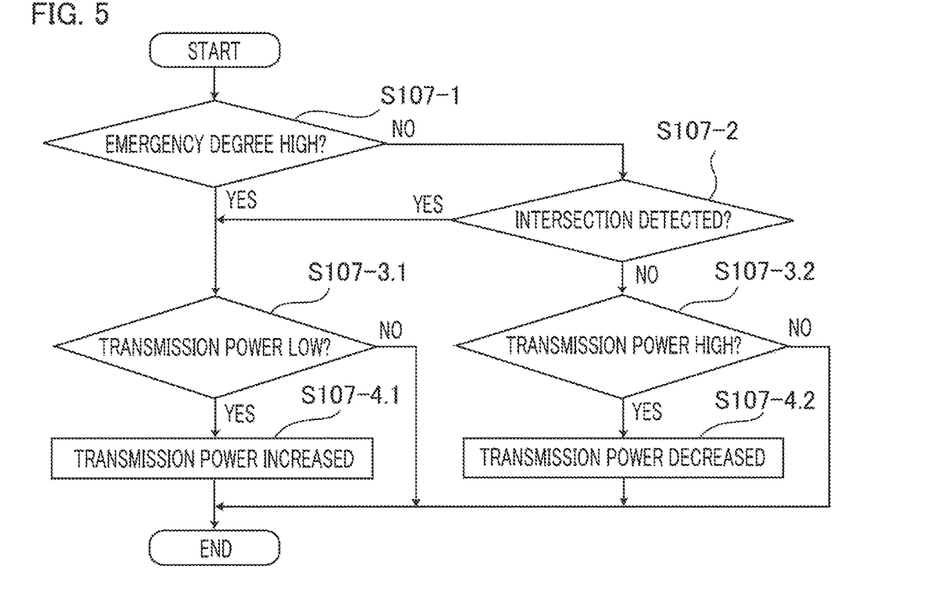
FIG. 5 is a flowchart representing transmission power setting processing in the communication apparatus according to Embodiment 1 of the present invention.

The transmission power setting processing (the step S107) will be explained with reference to the flowchart in FIG. 5. At first, in the case where it is determined in the emergency degree determination in the step S105 that the emergency degree is high (the step S107-1: YES) or in the case where it is determined that the emergency degree is not high (the step S107-1: NO) but an intersection has been detected through the intersection detection processing in the step S106 (the step S107-2: YES), the step S107-1 or the step S107-2 is followed by the step S107-3.1. In the case where it is determined that the emergency degree is not high (the step S107-1: NO) and no intersection has been detected (the step S107-2: NO), the step S107-2 is followed by the step S107-3.2.

In the step S107-3.1, in the case where the transmission power of the communication unit 11 has been set low (the step S107-3.1: YES), the control unit 10 increases the transmission power through the power setting unit 110 (the step S107-4.1). In the case where the transmission power of the communication unit 11 has already been set high (the step S107-3.1: NO), nothing is implemented and then the processing is ended.

In the step S107-3.2, in the case where the transmission power of the communication unit 11 has been set high (the step S107-3.21: YES), the control unit 10 decreases the transmission power through the power setting unit 110 (the step S107-4.2). In the case where the transmission power of the communication unit 11 has already been set low (the step S107-3.2: NO), nothing is implemented and then the processing is ended.

At last, in accordance with the flowchart in FIG. 2, the communication unit 11 performs data transmission with the transmission power set through the control unit 10 (the step S108) Heretofore, the typical operation of Embodiment 1 has been described.

The communication apparatus according to Embodiment 1 transmits high-emergency-degree data with high transmission power; thus, when transmitting high-emergency-degree information (e.g., sudden braking) of the reference vehicle by use of vehicle information, the control unit controls the transmission unit in such a way that the high-emergency-degree information is transmitted with increased transmission power. As a result, improvement of the transmission quality of high-emergency-degree data can be expected and hence high-emergency-degree information can be transmitted more securely than ever before.

The communication apparatus according to Embodiment transmits low-emergency-degree data with low transmission power; thus, when transmitting low-emergency-degree information (e.g., periodic position transmission) of the reference vehicle, the control unit controls the transmission unit in such a way that the low-emergency-degree information is transmitted with decreased transmission power. As a result, transmission interference with other high-emergency-degree data items can be reduced.

In the case where the emergency degree of the situation around the reference vehicle is high, the communication apparatus according to Embodiment 1 performs transmission with increased transmission power; thus, the control unit comprehends the situation around the reference vehicle through the vehicle position prediction unit for predicting the position of a neighboring vehicle; in the case where the emergency degree of the situation around the reference vehicle is high (e.g., there exists a risk of collision between the reference vehicle and the neighboring vehicle), the control unit controls the communication unit in such a way that the transmission is implemented with increased transmission power. As a result, improvement of the transmission quality of high-emergency-degree data, which corresponds to the present situation around the reference vehicle, can be expected and hence high-emergency-degree information can accurately and securely be transmitted.

In the case where the emergency degree of the situation around the reference vehicle is low, the communication apparatus according to Embodiment 1 performs transmission with decreased transmission power; thus, in the case where the emergency degree, of the situation around the reference vehicle, that is comprehended by the control unit is low (e.g., there exists no vehicle around the reference vehicle), the control unit controls the communication unit in such a way that the transmission is implemented with decreased transmission power. As a result, reduction of transmission interference with other high-emergency-degree data items can be expected.

In the case where the reference vehicle travels suddenly, for example, due to sudden braking, the communication apparatus according to Embodiment 1 performs transmission with increased transmission power; thus, when detecting a sudden travel (e.g. sudden braking, lane changing, or the like) of the reference vehicle, based on vehicle information, the control unit controls the communication unit in such a way that transmission is implemented with increased transmission power. As a result, improvement, of the transmission quality of data whose emergency degree is supposed to be high for neighboring vehicles can be expected; thus, only information whose emergency degree is supposed to be high for neighboring vehicles can securely be transmitted.

In the case where the reference vehicle is around an intersection, the transmission apparatus according to Embodiment 1 performs transmission with increased transmission power; thus, when detecting the intersection around the reference vehicle through the intersection detection unit, the control unit controls the transmission unit in such a way that transmission is implemented with increased transmission power. As a result, the emergency degree of data on vehicles around an intersection, where the accident incidence rate is high, is regarded as being high and preferential improvement of the transmission quality thereof can be expected.

In the case where the reference vehicle enters an intersection within a specified time, the transmission apparatus according to Embodiment 1 performs transmission with increased transmission power; thus, when the intersection detection unit detects the fact that reference vehicle enters an intersection within the specified time, the control unit controls the transmission unit in such a way that transmission is implemented with increased transmission power. As a result, the emergency degree of data on a vehicle that enters an intersection, where the accident incidence rate is high, is regarded as being high (the emergency degree of data on a vehicle that does not pass through the intersection is of high), preferential improvement of the communication quality can be expected.

The communication apparatus according to Embodiment 1 can increase the transmission power when high-emergency-degree information or a high-risk scene exists and can decrease the transmission power when low-emergency-degree information or a low-risk scene exists; therefore, the transmission quality can be improved in an environmental situation about which the driver should be cautious.

Embodiment 2

Figure 6:
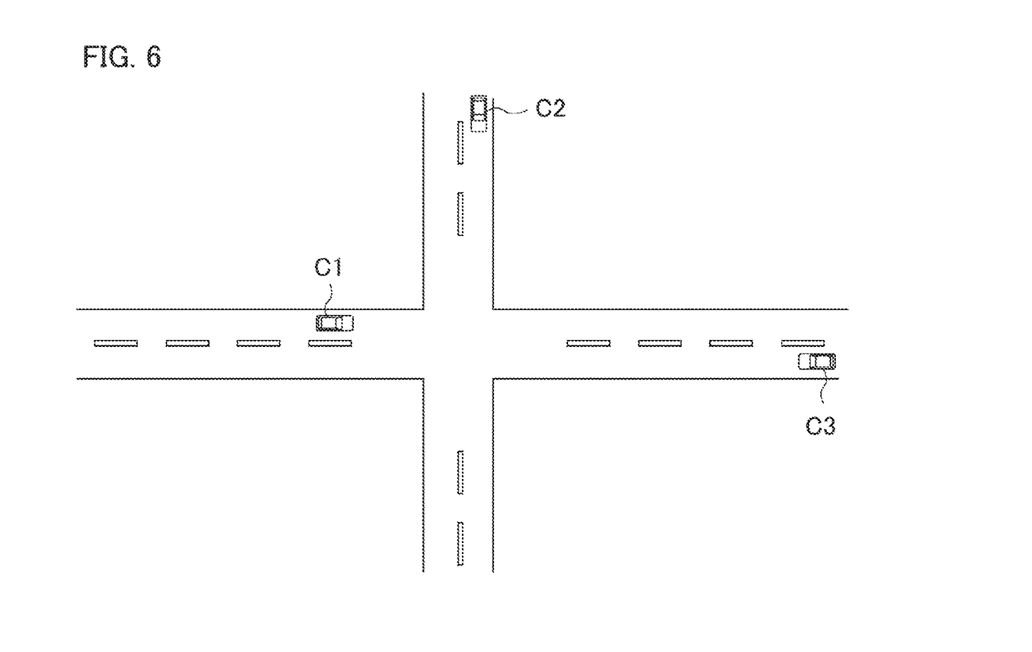
FIG. 6 is a view for explaining a communication system according to Embodiment 2 of the present invention.

Next, a communication system in which the communication apparatus explained in Embodiment 1 is utilized will be described. FIG. 6 is a view for explaining a communication system according to Embodiment 2 of the present invention. In the communication system, a plurality of vehicles, for example, vehicles C1, C2, and C3 are each equipped with the communication apparatus 1 that implements the operation and processing, which have been explained in Embodiment 1. In this communication system, the transmission power is controlled in such a way as to be increased in accordance with the emergency degree of communication data among the plurality of communication apparatuses, for example, in proportion to the emergency degree of communication data. For example, in the communication system represented in FIG. 2, the transmission power of the vehicle C1 is increased because the vehicle C1 is located nearest to an intersection; however, the transmission power of each of the vehicles C2 and C3 is decreased because the vehicles C1 and C2 are located farther from the intersection. In this case, the respective times that elapse before the vehicles enter the intersection are calculated in the step S106 in FIG. 2; the transmission power from the vehicle C1, located at a position that is nearest to the intersection and at which it takes shortest time by the time the vehicle C1 enters the intersection, is set to be highest; the transmission power from the vehicle C2, located at a position that is second nearest to the intersection and at which it takes second shortest time by the time the vehicle C2 enters the intersection, is set to be second highest; the transmission power from the vehicle C3, located at a position that is farthest from the intersection and at which it takes longest time by the time the vehicle C3 enters the intersection, is set to be lowest; thus, information can be transmitted to the neighboring vehicles in accordance with the emergency degree of communication data among the vehicles.

The communication system according to Embodiment 2 is configured with the plurality of communication apparatuses, and, in each of the communication apparatuses, the transmission power is increased in proportion to the emergency degree of information; therefore, it is made possible to reduce communication interference, and it can be expected that the communication quality for information can be improved in proportion to the emergency degree thereof for all of the vehicles that utilize the communication system.

Moreover, building of a drive assistance system and a vehicle control system by utilizing the communication apparatus according to Embodiment 1 makes it possible that each of the systems can preferentially perform assistance that is directly linked to the safety of a driver; concurrently, because the communication quality for assistance is proportional to the emergency degree thereof, assistance in the state where the system is stable can be performed.

In the scope of the present invention, it is possible that each of embodiments is freely combined, or each of embodiments is suitably modified or omitted.

What is claimed is:

1. A communication apparatus mounted in a vehicle and comprising:
   a communication unit that has a power setting unit and performs inter-vehicle communication; and
   a control unit that has a vehicle information acquisition unit for acquiring vehicle information and a reference vehicle position estimation unit for estimating a present position of a reference vehicle and controls the communication unit,
   wherein when high-emergency-degree information of the reference vehicle is transmitted by use of vehicle information, the control unit controls the communication unit in such a way that transmission is performed with increased transmission power, and
   wherein the control unit has a vehicle position prediction unit for predicting a position of a neighboring vehicle; the control unit comprehends a situation around the reference vehicle through prediction by the vehicle position prediction unit; and in the case where the emergency degree of the situation around the reference vehicle is high, the control unit controls the communication unit in such a way that transmission is performed with increased transmission power.

2. The communication apparatus according to claim 1, wherein when low-emergency-degree information of the reference vehicle is transmitted, the control unit controls the communication unit in such a way that transmission is performed with decreased transmission power.

3. The communication apparatus according to claim 1, wherein in the case where the emergency degree of the comprehended situation around the reference vehicle is low, the control unit controls the communication unit in such a way that transmission is performed with decreased transmission power.

4. The communication apparatus according to claim 1, wherein when detecting a sudden travel of the reference vehicle, based on vehicle information, the control unit controls the communication unit in such a way that transmission is performed with increased transmission power.

5. A communication system wherein the communication apparatus according to claim 4 is provided in each of a plurality of vehicles, and the communication apparatus performs control in such a way that transmission power is proportional to the emergency degree of communication data among the plurality of vehicles.

6. The communication apparatus according to claim 1, wherein when detecting a sudden travel of the reference vehicle, based on vehicle information, the control unit controls the communication unit in such a way that transmission is performed with increased transmission power.

7. A communication system wherein the communication apparatus according to claim 1 is provided in each of a plurality of vehicles, and the communication apparatus performs control in such a way that transmission power is proportional to the emergency degree of communication data among the plurality of vehicles.

8. A communication system wherein the communication apparatus according to claim 1 is provided in each of a plurality of vehicles, and the communication apparatus performs control in such a way that transmission power is proportional to the emergency degree of communication data among the plurality of vehicles.

9. The communication apparatus according to claim 1, wherein the control unit has an intersection detection unit; and when the intersection detection unit detects an intersection around the reference vehicle, the control unit controls the communication unit in such a way that transmission is performed with increased transmission power, and wherein when the intersection detection unit detects the fact that the reference vehicle enters an intersection within a predetermined specified time, the control unit controls the communication unit in such a way that transmission is performed with increased transmission power.

\* \* \* \* \*